(12) United States Patent
Doraiswamy et al.

(10) Patent No.: US 12,468,708 B2
(45) Date of Patent: Nov. 11, 2025

(54) GPU-BASED DATABASE OPERATORS USING THE GRAPHICS PIPELINE

(71) Applicant: Microsoft Technology Licensing, LLC, Redmond, WA (US)

(72) Inventors: Harish Doraiswamy, Karnataka (IN); Karthik Saligrama Ramachandra, Karnataka (IN); Jayant Ramaswamy Haritsa, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 18/331,578

(22) Filed: Jun. 8, 2023

(65) Prior Publication Data

US 2024/0411761 A1  Dec. 12, 2024

(51) Int. Cl.
*G06F 16/2455* (2019.01)
*G06F 16/2453* (2019.01)
*G06F 16/248* (2019.01)
*G06T 1/20* (2006.01)

(52) U.S. Cl.
CPC .. *G06F 16/24556* (2019.01); *G06F 16/24537* (2019.01); *G06F 16/24544* (2019.01); *G06F 16/2456* (2019.01); *G06F 16/248* (2019.01); *G06T 1/20* (2013.01)

(58) Field of Classification Search
CPC ... G06T 1/20; G06T 15/005; G06F 16/24537; G06F 16/24544; G06F 16/24556; G06F 16/2456; G06F 16/24569; G06F 16/248; G06F 16/284

USPC .......................................................... 345/506
See application file for complete search history.

(56) References Cited

U.S. PATENT DOCUMENTS

| | | | | |
|---|---|---|---|---|
| 6,671,407 | B1* | 12/2003 | Venkatesan | G06T 1/005 |
| | | | | 707/E17.02 |
| 11,361,401 | B2* | 6/2022 | Tu | G06T 1/20 |
| 2009/0070315 | A1* | 3/2009 | Ahmed | G06F 16/24557 |
| | | | | 707/999.005 |
| 2020/0125368 | A1* | 4/2020 | Kaldewey | G06F 16/24569 |

OTHER PUBLICATIONS

Harish Doraiswamy et al., A Case for Graphics-Driven Query Processing, Proceedings of the VLDB Endowment, vol. 16, Issue 10, Jun. 2023, pp. 2499-2511.*
Harish Doraiswamy et al., GPU-Powered Spatial Engine for Commodity Hardware: Extended Version, arXiv:2203.14362v1 [cs.DB], Mar. 27, 2022, pp. 1-29.*
Johns Paul et al., GPL: A GPU-Based Pipelined Query Processing Engine, SIGMOD '16: Proceedings of the 2016 International Conference on Management of Data, Jun. 2016, pp. 1935-1950.*

(Continued)

*Primary Examiner* — Jacinta M Crawford
(74) *Attorney, Agent, or Firm* — Ray Quinney & Nebeker P.C.; Tiffany B. Healy

(57) ABSTRACT

The present disclosure relates to methods and systems for using the computer graphics pipeline to execute database query operations on a graphics processing unit (GPU). The methods and systems use the graphics pipeline to transform relational data into images of the relational data. The methods and systems use the graphics pipeline to perform relational database operations on the images in response to a query and output a query result for the database operations.

19 Claims, 13 Drawing Sheets

(56) References Cited

OTHER PUBLICATIONS

Bingsheng He et al., Relational Joins on Graphics Processors, SIGMOD '08: Proceedings of the 2008 ACM SIGMOD International Conference on Management of Data, Jun. 2008, pp. 511-524.*

Nathaniel Duca et al., A Relational Debugging Engine For The Graphics Pipeline, ACM Transactions on Graphics (TOG), vol. 24, Issue 3, Jul. 2005, pp. 453-463.*

Naga K. Govindaraju et al., Fast Computation of Database Operations Using Graphics Processors, Proceedings of the ACM SIGMOD International Conference on Management of Data, Jun. 2004, pp. 206-217.*

"Fowler-Noll-Vo hash function", Retrieved from: https://en.wikipedia.org/wiki/Fowler%E2%80%93Noll%E2%80%93Vo_hash_function, Sep. 25, 2022, 5 Pages.

"Metal Framework", Retrieved from: https://developer.apple.com/documentation/metal, Retrieved Date: Jan. 21, 2023, 6 Pages.

"Vulkan API", Retrieved from: https://www.vulkan.org/, Retrieved Date: Jan. 21, 2023, 7 Pages.

Chrysogelos, Periklis, "Efficient Analytical Query Processing on CPU-GPU Hardware Platforms", In Thesis of EPFL, Jul. 29, 2022, 132 Pages.

Dewitt, et al., "Implementation Techniques for Main Memory Database Systems", In Proceedings of the SIGMOD International Conference on Management of Data, Jun. 18, 1984, 8 Pages.

Funke, et al., "Data-Parallel Query Processing on Non-Uniform Data", In Proceedings of the VLDB Endowment, vol. 13, Issue 6, Mar. 2020, pp. 884-897.

Funke, et al., "Pipelined Query Processing in Coprocessor Environments", n Proceedings of the International Conference on Management of Data, Jun. 10, 2018, pp. 1603-1618.

Govindaraju, et al., "Fast and Approximate Stream Mining of Quantiles and Frequencies Using Graphics Processors", In Proceedings of ACM SIGMOD International Conference on Management of Data, Jun. 14, 2005, pp. 611-622.

Govindaraju, et al., "Fast Computation of Database Operations Using Graphics Processors", In Proceedings of the Acm Sigmod International Conference on Management of Data, Jun. 13, 2004, 12 Pages.

Govindaraju, et al., "GPUTeraSort: High Performance Graphics Co-processor Sorting for Large Database Management", In Proceedings of the Acm Sigmod international conference on Management of data, Jun. 27, 2006, pp. 325-336.

Gray, et al., "Data cube: A Relational Aggregation Operator Generalizing Group-by, Cross-tab, and Sub-totals", In Journal of Data Mining and Knowledge Discovery, vol. 1, Issue 1, Mar. 1997, pp. 29-53.

Guo, "In-Memory Join Algorithms on GPUs for Large-Data", In Proceedings of IEEE 21st International Conference on High Performance Computing and Communications; IEEE 17th International Conference on Smart City; IEEE 5th International Conference on Data Science and Systems (HPCC/SmartCity/DSS), Aug. 10, 2019, pp. 1060-1067.

He, et al., "Relational Joins on Graphics Processors", In Proceedings of the ACM SIGMOD International Conference on Management of Data, Jun. 9, 2008, pp. 511-524.

Kaldewey, et al., "GPU Join Processing Revisited", In Proceedings of the 8th International Workshop on Data Management on New Hardware, May 21, 2012, pp. 55-62.

Karnagel, et al., "Optimizing GPU-accelerated Group-By and Aggregation", In ADMS@ VLDB, vol. 8, Aug. 2015, pp. 1-12.

Kiao, UE, "Probability of Collision in Hash Function", Retrieved from: https://iq.opengenus.org/probability-of-collision-in-hash/, Retrieved Date: Jan. 21, 2023, 10 Pages.

Lutz, et al., "Triton Join: Efficiently Scaling to a Large Join State on GPUs with Fast Interconnects", In Proceedings of the International Conference on Management of Data, Jun. 2022, pp. 1017-1032.

Paul, et al., "Database Systems on GPUs", In Journal of Foundations and Trends® in Databases, vol. 11, Issue 1, Jul. 2021, 43 Pages.

Rosenfeld, et al., "Performance Analysis and Automatic Tuning of Hash Aggregation on GPUs", In Proceedings of the 15th International Workshop on Data Management on New Hardware, Jul. 2019, 11 Pages.

Rosenfeld, et al., "Query Processing on Heterogeneous CPU/GPU Systems", In ACM Computing Surveys, vol. 55, Issue 1, Jan. 2022, pp. 1-38.

Rui, et al., "Efficient Join Algorithms For Large Database Tables in a Multi-GPU Environment", In Proceedings of the VLDB Endowment, vol. 14, Issue 4, Dec. 1, 2020, pp. 708-720.

Rui, et al., "Fast Equi-Join Algorithms on GPUs: Design and Implementation", In Proceedings of the 29th International Conference on Scientific and Statistical Database Management, Jun. 2017, 12 Pages.

Shanbhag, et al., "A Study of the Fundamental Performance Characteristics of GPUs and CPUs for Database Analytics", In Proceedings of the ACM SIGMOD International Conference on Management of Data, Jun. 14, 2020, pp. 1617-1632.

Shreiner, et al., "OpenGL Programming Guide: The Official Guide to Learning OpenGL", In Publication of Addison-Wesley Professional, Mar. 2013, 986 Pages.

Sioulas, et al., "Hardware-Conscious Hash-Joins on GPUs", In Proceedings of IEEE 35th International Conference on Data Engineering (ICDE), Apr. 8, 2019, pp. 698-709.

Sun, et al., "Hardware acceleration for spatial selections and joins", In Proceedings of the ACM SIGMOD international conference on Management of data, Jun. 2003, pp. 455-466.

Tome, et al., "Optimizing Group-By And Aggregation using GPU-CPU Co-Processing", In InADMS@ VLDB, Jan. 1, 2018, 11 Pages.

White, et al., "DirectX programming", Retrieved from: https://learn.microsoft.com/en-us/windows/uwp/gaming/directx-programming, Oct. 21, 2022, 1 Page.

Doraiswamy et al., "A Case for Graphics-Driven Query Processing," Proceedings of the VLDB Endowment, Jun. 1, 2023, pp. 2499-2511.

Doraiswamy et al., "SPADE: GPU-Powered Spatial Database Engine for Commodity Hardware," IEEE 38th International Conference on Data Engineering, May 9, 2022, pp. 2669-2681.

Govindaraju et al., "Fast Computation of Database Operations Using Graphics Processors," ACM SIGGRAPH, Jul. 31, 2005, 12 Pages.

International Search Report and Written Opinion received for PCT Application No. PCT/US2024/032325, Aug. 6, 2024, 12 pages.

* cited by examiner

GPU-BASED DATABASE OPERATORS USING THE GRAPHICS PIPELINE

BACKGROUND

Graphics processing units (GPUs) have become mainstream in computing platforms. Heterogeneous (central processing unit (CPU) and GPU) platforms are becoming more common with CPUs having an integrated GPU. With data sizes continuously increasing, executing database queries becomes a bottleneck, especially in analytics tasks. A variety of techniques have been proposed in the literature to harness the power of GPUs in query processing engines. However, these earlier techniques have focused only on devising customized low-level mechanisms that utilize the raw hardware parallelism provided by GPUs.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving a query with a relational database operation to perform on relational data. The method includes using a graphics pipeline to perform the relational database operation on the relational data. The method includes outputting a query result of the relational database operation.

Some implementations relate to a device. The device includes a processor; memory in electronic communication with the processor; and instructions stored in the memory, the instructions being executable by the processor to: receive a query with a relational database operation to perform on relational data; use a graphics pipeline to perform the relational database operation on the relational data; and output a query result of the relational database operation.

Some implementations relate to a method. The method includes transforming, using a vertex shader of a graphics pipeline, relational data into two-dimensional (2D) points. The method includes creating, using vertex post processing, pixels from the 2D points. The method includes using, a fragment shader and fragment processing of the graphics pipeline, to form an image of the relational data from the pixels.

Some implementations relate to a device. The device includes a processor; memory in electronic communication with the processor; and instructions stored in the memory, the instructions being executable by the processor to: transform, using a vertex shader of a graphics pipeline, relational data into two-dimensional (2D) points; create, using vertex post processing, pixels from the 2D points; and use, a fragment shader and fragment processing of the graphics pipeline, to form an image of the relational data from the pixels.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
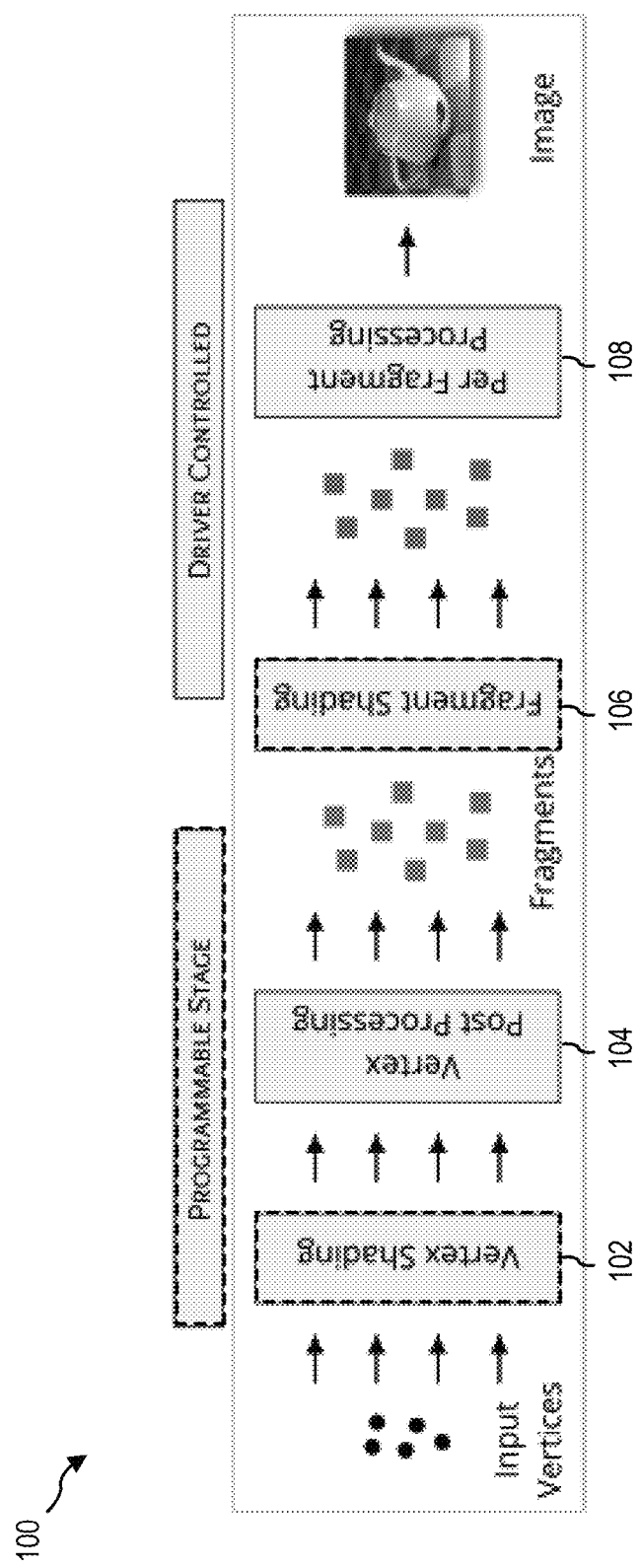
FIG. 1 illustrates an example graphics pipeline in accordance with implementations of the present disclosure.

With data sizes continuously increasing, executing database queries becomes a bottleneck, especially in analytics tasks. Solutions have been provided to harness the power of graphics processing unit (GPU) s in query processing engines. Existing solutions are customized low-level mechanisms that utilize the raw hardware parallelism provided by GPUs. Existing solutions target specific hardware architectures and are dependent on a specific GPU provided by a vendor and existing solution must catch up with the hardware evolution. Moreover, due to the widespread use of CUDA-based GPU programming, which is primarily intended for NVIDIA platforms, existing solutions cannot work across hardware from different vendors.

The methods and systems of the present disclosure use the computer graphics pipeline to execute database query operations on a graphics processing unit (GPU). The GPU is designed to draw complex scenes (e.g., three-dimensional (3D) graphics) at high frame-rates. Graphics-intensive applications, such as games, require constant rendering of complex scenes that are continuously changing. The rendered scene at a given time step is called a frame, which contains geometric objects as seen by a camera at that time step. Achieving smooth transitioning between adjacent frames requires a high frame rendering rate. GPUs are designed to speed up precisely these operations which are executed as part of the graphics pipeline.

The graphics pipeline (also known as the shader pipeline) features a high-level interface for easy use of the GPU hardware, while the graphics drivers handle low-level tasks, such as thread scheduling, parallel rasterization, etc. Since these drivers are hardware-specific, applications using the graphics pipeline are automatically optimized for the underlying hardware.

The graphics pipeline splits the drawing process into a sequence of stages. The graphics pipeline incorporates features to maximize the GPU-based performance of applications, such as, games. The graphics pipeline decomposes the rendering operation, which transforms an input 3D scene to a 2D camera image, into a collection of smaller (and simpler) stages, with each stage executed as a collection of parallel threads providing the graphics driver the flexibility to schedule threads spanning across stages, thus maximizing GPU utilization.

The methods and systems of the present disclosure deconstruct the relational database query operations into smaller steps amenable to rendering operations that leverage the graphics pipeline features. Relational database operations involve manipulating one or more tables of relational data that include data related to one another. In some implementations, the database query operations include a join operation. The join operation combines columns from one or more input tables into a new table. One example join operation is an equi-join operation that combines records across tables that group by operation. The group by operation partitions rows of an input table into groups based on common values in one or more columns. For example, grouping is used to apply have matching fields. In some implementations, the database query operations include a an aggregate function for each group. The result of an aggregate on a group by query is one row for each distinct group. In some implementations, the methods and systems implement a GPU-based multi-attribute group by query operation.

One technical advantage of the methods and systems of the present disclosure is executing database queries faster. Effectively utilizing the GPUs for database queries significantly reduces query times. Another technical advantage of the methods and systems of the present disclosure is the query processing is agnostic to underlying hardware and changes in GPU architecture requiring only a change of drivers. The methods and systems of the present disclosure work across hardware from different vendors allowing the methods and systems to easily port to different hardware.

Another technical advantage of the methods and systems of the present disclosure is attaining auto-tuned performance due to the graphics drivers which are customized to the underlying hardware allowing the methods and systems of the present disclosure to work with technology through new drivers offered by the graphics vendors. Another technical advantage of the methods and systems of the present disclosure is query operator designs that use both compute and graphics hardware for the database query operations. The methods and systems of the present disclosure leverage the GPU to efficiently process the database operations. The present disclosure includes several practical applications that provide benefits and/or solve problems associated with executing database queries.

Referring now to FIG. 1, illustrated is an example graphics pipeline 100. In some implementations, a single GPU processes the graphics pipeline 100. In some implementations, a plurality of GPUs in communication with each other process the graphics pipeline 100.

The graphics pipeline 100 includes a sequence of stages (vertex shader 102, vertex post processing 104, fragment shader 106, fragment processing 108). The vertex shader 102 stage and the fragment shader 106 stage are customizable by a developer through the use of programmable shaders. The vertex post processing 104 stage and the fragment processing 108 stage are controlled by the driver.

The first stage of the graphics pipeline 100 is the vertex shader 102 stage. The vertex shading is used to transform the vertices corresponding to the objects in a scene into a common screen space (the coordinate system with respect to the camera), known as model-view-projection. The developer can customize the processing of each vertex through the use of a vertex shader 102, which executes in a Single Program Multiple Data (SPMD) fashion over the vertices. The input vertices are bound to the graphics pipeline 100 using specialized memory objects called vertex buffers. The graphics driver appropriately schedules the threads corresponding to the different vertex shaders 102, and also prefetches the vertex data from the vertex buffer into the local memory to improve the performance of this stage.

The vertex post processing 104 stage of the graphics pipeline 100 is handled by the GPU's native driver and is used for clipping and rasterization. Clipping is the process where primitives outside the viewport (the region visible from the camera) are removed. Primitives such as lines and triangles that partially intersect the viewport are also cropped during this operation, resulting in a new set of primitives that are fully contained within the viewport. Once clipped, the remaining primitives are then rasterized, where rasterization is the process that converts each primitive into a collection of fragments. A fragment can be considered as the modifiable data corresponding to a pixel. Therefore, the fragment size depends on the screen resolution.

The fragment shader 106 stage of the graphics pipeline 100 is another developer customizable stage that processes all the fragments generated after rasterization, using the logic programmed in a fragment shader 106. The fragment shader 106 is used to compute and set the color for each fragment. Depending on the required functionality, the fragment shader 106 may also be used for other purposes, such as, discarding fragments, writing to additional output buffers, etc. As with the vertex shader 102, the driver is responsible for scheduling the threads, and appropriately prefetching and setting up the local memory to improve the shader performance.

The final stage of the graphics pipeline 100 is the fragment processing 108 stage. The fragment processing 108 individually processes the fragments that are output from the fragment shader 106 and generates the pixels for the rendered image. There may be multiple fragments corresponding to a given pixel. Such fragments are combined in parallel through an operation called blending to finally generate a single pixel.

The graphics application programming interface (API) also supports rendered images to be output to a virtual screen represented by a frame buffer object (FBO). Each FBO can be associated with one or more color attachments. A color attachment is used to represent the color of the pixels, and stores 4 values (r, g, b, a), per pixel, corresponding to the red, blue, green, and alpha color channels. Each attachment is associated with a texture that stores the actual color data.

In some implementations, one or more computing devices (e.g., servers and/or devices) are used to perform the processing of the graphics pipeline 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the graphics pipeline 100 is implemented wholly on the same computing device. Another example includes one or more subcomponents of the graphics pipeline 100 are implemented across multiple computing devices. Moreover, in some implementations, one or more subcomponent of the graphics pipeline 100 may be implemented are processed on different server devices of the same or different cloud computing networks.

In some implementations, the components of the graphics pipeline 100 are in communication with each other using any suitable communication technologies. In addition, while the components of the graphics pipeline 100 are shown to be separate, any of the components or subcomponents may be combined into fewer components, such as into a single component, or divided into more components as may serve a particular implementation. In some implementations, the components of the graphics pipeline 100 include hardware, software, or both. For example, the components of the graphics pipeline 100 may include one or more instructions stored on a computer-readable storage medium and executable by processors of one or more computing devices. The processors may be any electronic component capable of storing electronic information. For example, the memory may be embodied as random access memory (RAM), read-only memory (ROM), magnetic disk storage mediums, optical storage mediums, flash memory devices may be a GPU. Memory is in electronic communication with the processors. The memory in RAM, on-board memory included with the processor, erasable programmable read-only memory (EPROM), electrically erasable programmable read-only memory (EEPROM) memory, registers, and so forth, including combinations thereof. When executed by one or more processors, the computer-executable instructions of one or more computing devices can perform one or more methods described herein. In some implementations, the components of the graphics pipeline 100 include hardware, such as a special purpose processing device to perform a certain function or group of functions. In some implementations, the components of the graphics pipeline 100 include a combination of computer-executable instructions and hardware.

Figure 2:
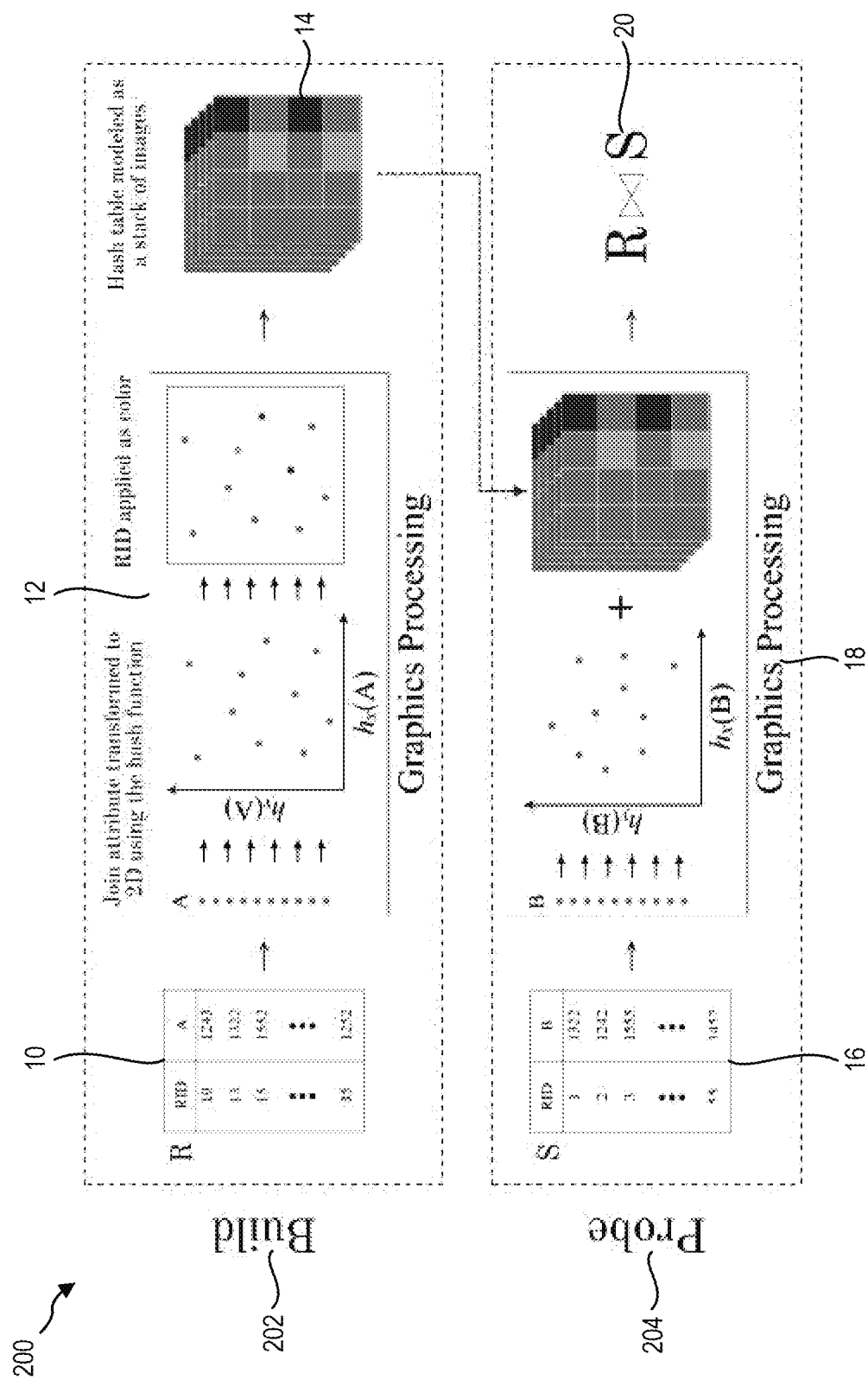
FIG. 2 illustrates an example environment using the graphics pipeline to perform a join query operation in accordance with implementations of the present disclosure.

Referring now to FIG. 2, illustrated is an example environment using the graphics pipeline 100 (FIG. 1) to perform a join database operation. The join database operation joins input tables (e.g., the input table R 10 and input table S 16). In some implementations, the join database operation is an equi-join operation that combines records across tables that have matching fields. The graphics pipeline 100 provides a high-level interface for easy use with the GPU hardware. In some implementations, a single GPU processes the graphics pipeline 100. In some implementations, a plurality of GPUs in communication with each other process the graphics pipeline 100.

The environment 200 includes a build phase 202 and a probe phase 204. The build phase 202 performs the graphics processing 12, using the graphics pipeline 100, on the input table R 10 to transform and render the build relation points of the input table R 10 to create the hash table 14, which is represented as a stack of 2D images. The row identifiers from the input table R 10 are used as color to generate these images.

Figure 3:
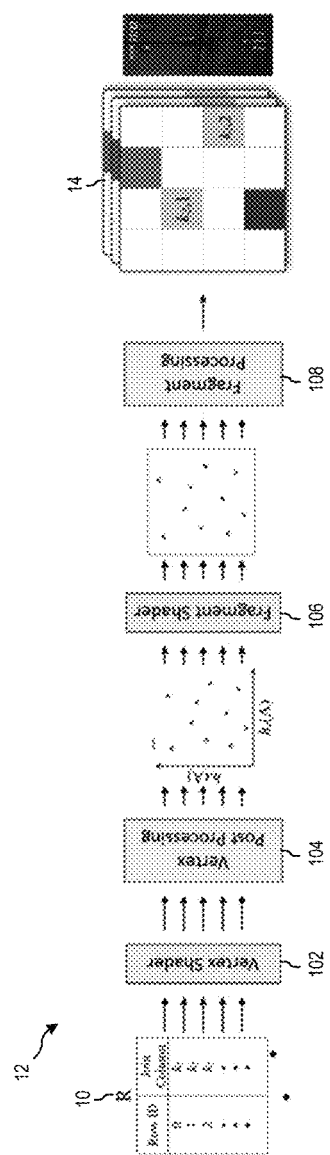
FIG. 3 illustrates an example build phase of a join operation performed by the graphics pipeline in accordance with implementations of the present disclosure.

FIG. 3 illustrates an example of the graphics processing 12 using the graphics pipeline 100 for the build phase 202 (FIG. 2) of a join operation. The join attribute values in the input table R 10 are represented as a set of one-dimensional points which are transformed to two dimensions by the hash function using the vertex shader 102. The vertex shader 102 maps every row in the input table R 10 to a 2D point using a hash function. The vertex post processing 104 takes the 2D points and converts the 2D points into a set of pixels (the fragments) with a coordinate position.

The fragment shader 106 assigns colors to the set of pixels. The color channels (r, g, b, a) are used to store the hash tables. The fragment processing 108 stage forms a set of images of the tabular data from the input table R 10. The hash table 14 is the set of images formed by the fragment processing 108 stage. The additional images handle collisions where the rows in the input table R 10 map to a common coordinate (position).

By using the graphics pipeline 100 to perform the graphics processing 12 of the build phase 202, the graphics driver determines the layout for the data and accesses the data. The GPU(s) automatically create the parallel threads for processing the graphics pipeline 100.

Referring back to FIG. 2, the join operation is accomplished in the probe phase 204 by rendering the probe relation against the hash table 14 and outputting a query result 20. The probe phase 204 performs the graphics processing 18, using the graphics pipeline 100, on the input table S 16. A lookup is performed for every row in the input table S 16 to determine whether a match occurs with any rows in the input table R 10 to determine all pairs of the input table R 10 and the input table S 16 where the join attribute values are the same. The query result 20 is the join of the input table R 10 and the input table S 16.

Figure 4:
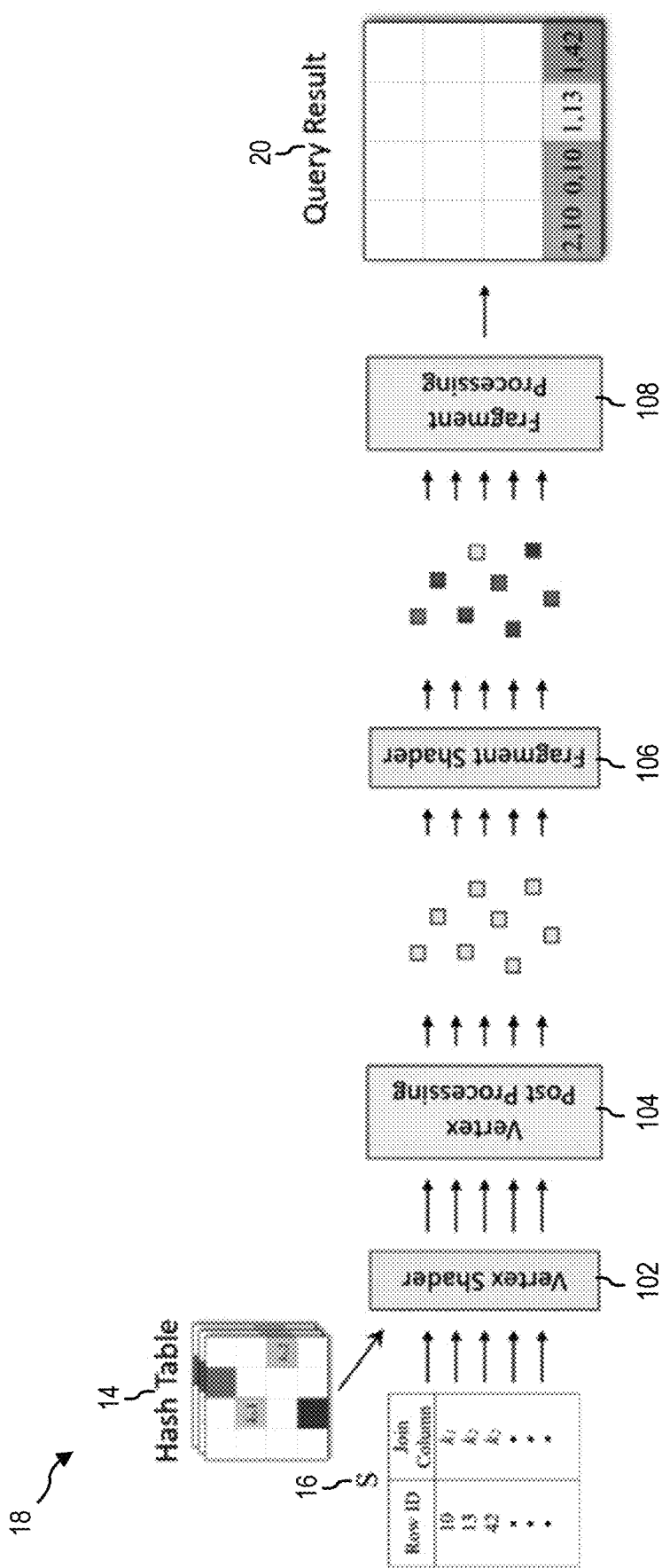
FIG. 4 illustrates an example probe phase of a join operation performed by the graphics pipeline in accordance with implementations of the present disclosure.

FIG. 4 illustrates an example of the graphics processing 18 using the graphics pipeline 100 for the probe phase 204 (FIG. 2) of a join operation. The hash table 14 and the input table S 16 are provided to the vertex shader 102. The vertex shader 102 applies a hash function to the input table S 16 to determine a value of a position. The vertex shader 102 determines whether a match occurs between the value of the position and the value in the hash table 14 at that position. If a match occurs, the value and the position is sent to the vertex post processing 104 stage to become a pixel. If a match does not occur, the value and the position do not proceed to the vertex post processing 104 stage.

The vertex post processing 104 stage identifies all the matches between the rows in the input table S 16 and the hash table 14. The fragment shader 106 assign output pairs for the matches and the fragment processing 108 stage generates the query result 20 with the join of the input table R 10 and the input table S 16, which is then returned to the CPU.

Referring to FIG. 2, the example environment 200 may be used to perform other relational database operations. In some implementations, the example environment 200 is used to perform a group by database operation. For example, the example environment 200 is used to perform the group by on the input table R 10. The build phase 202 uses the graphics processing 12 to create a series of hash images on the grouping attribute k for the input table R 10. A hash table 14 with a plurality of 2D images is created in the build phase 202, where each new image is created for hash collisions, and not for duplicate attribute values. The implicit vertex index provided by the graphics pipeline 100 is used as the RID while generating the 2D images for the hash table 14. The probe phase 204 uses the graphics processing 18 to generate the query result 20 with the output for the group by result.

Figure 5:
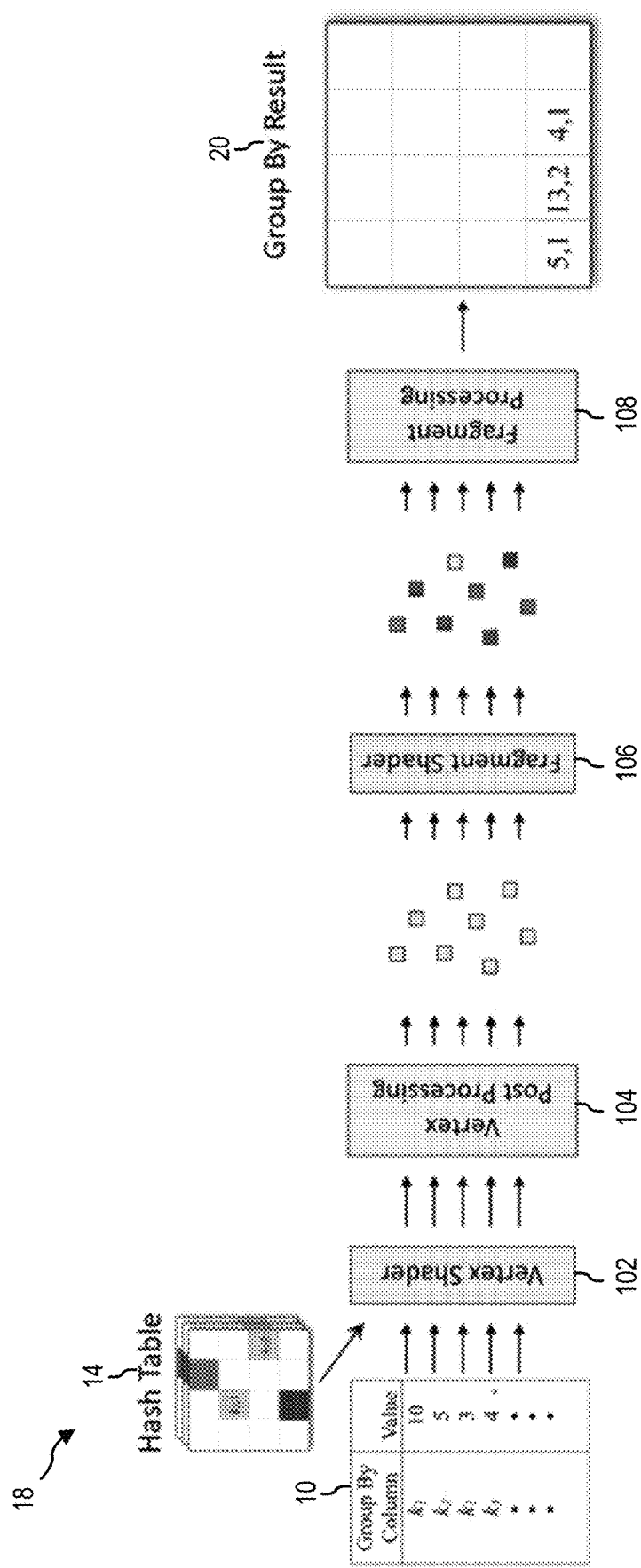
FIG. 5 illustrates an example probe phase of a group by operation performed by the graphics pipeline in accordance with implementations of the present disclosure.

Referring now to FIG. 5, illustrated is an example of the graphics processing 18 using the graphics pipeline 100 for the probe phase 204 (FIG. 2) of a group by operation. The hash table 14 (e.g., a plurality of 2D images) created in the build phase 202 is used by the vertex shader 102 to map each tuple of the input table R 10 to a unique position defined by the grouping value. The vertex post processing 104 generates the fragments with the position and the grouping value.

The fragment shader 106 assigns the values to be aggregated to the fragments. The fragment processing 108 applies a blend function based on the aggregation function. The fragment shader 106 outputs the appropriate colors for the fragments depending on the aggregation function. Example aggregation functions include count, sum, minimum, maximum, and average. The colors are blended together in the fragment processing 108 stage to generate the final output FBO with the group by query result 20, which is then returned to the CPU.

In some implementations, a database query includes a plurality of operations and the graphics pipeline 100 is used to perform a subset of the operations included in the database query while a CPU processes the other operations included in the database query. For example, the database query includes a join operation, a group by operation, a project operation, and a difference operation and the graphics pipeline 100 is used to process the join and group by operation for the database query on the GPU(s) while a CPU processes the project and difference operations for the database query. Another example includes, the database query includes a plurality of join operations and a project operation, and the GPU(s) perform the plurality of join operations while a CPU processes the project operation. By using the GPU(s) to process a subset of the operations included in the database query, faster queries on the database are enabled.

By using the graphics pipeline 100 to perform the relational database operations (for example, as illustrated in FIGS. 2-5), the hardware tuning is automatically obtained by being pipeline conscious. By processing the data similar to vertices, the graphics driver manages the parallelism of the data, but also the necessary data allocation across different thread groups to optimize fast vertex data reads (including data pre-fetching). In addition, by making use of images to store the hash tables 14, faster texture lookup operations occur and more efficient data writes into the FBOs occur. Moreover, the writes occur post the fragment shader 106 and are controlled by the graphics driver, which optimizes the order of writes, resulting in faster rendering times. By using the graphics pipeline 100 and writing to the FBO, the write minimizes cache misses and random accesses.

Figure 6:
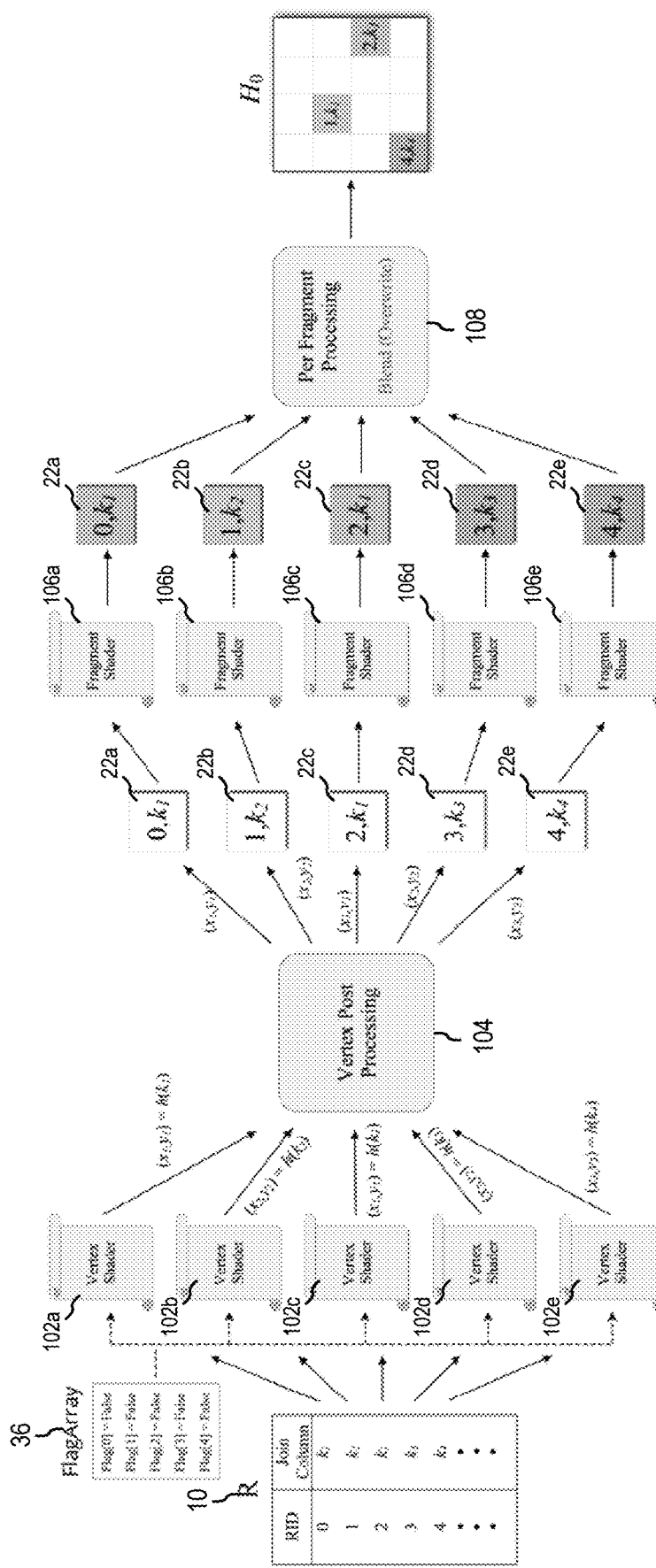
FIG. 6 illustrates an example graphics rendering pipeline for a first iteration of a build phase in accordance with implementations of the present disclosure.

FIG. 6 illustrates an example of a rendering pipeline for the graphics processing 12 (FIG. 2) for a first iteration of a build phase 202 (FIG. 2) performed by the graphics pipeline 100 (FIG. 1). In some implementations, the join operation is an equi-join operation. The join relations are R (the input table R 10) and S (the input table S 16 (FIG. 2), with |R|=n, |S|=m. The input to the join operator is a set of 32-bit integer pairs (RID, k) in the input table R 10, where RID is a record identifier in the relation, and k is the value of the join attribute in this row. In some implementations, the join attributes are 32-bit integers. In some implementations, the join attributes are 64-bit integers. In some implementations, the join attributes are strings.

The graphics processing 12 uses a partitioned hash join, wherein the input table R 10 and the input table S 16 are first partitioned on the CPU into smaller batches that fit in the GPU memory, and these batches are then iteratively processed on the GPU. In some implementations, the graphics processing 12 uses radix partitioning, such that the biggest partition can comfortably reside in GPU memory. For a given partition pair ($R_j$, $S_j$), all of the above structures are fully resident within GPU memory.

In the illustrated example, consider a partition ($R_j$, $S_j$), $R_j \subseteq R$, $S_j \subseteq S$ that is being joined and that the hash table 14 is built on $R_j$. The hash table 14 is represented as a plurality of 2D images corresponding to FBOs. Within the FBOs, the pixel color channels are used to represent the join attribute values and their RIDs. The pixel locations in the 2D image are determined through hash functions on the attribute values. A pair of (independent) hash functions, $h_x$ and $h_y$, are used to transform the attribute value k to a 2D image location.

An example equation the vertex shader 102 uses to transform the attribute k to a 2D image location is illustrated below in equation (1).

$$h_x: Z \to [0, res_x - 1] \quad h_y: Z \to [0, res_y - 1] \tag{1}$$

where resx, resy is the resolution of each image. The hash function h is defined as $h(k)=(h_x(k), h_y(k))$. The vertex shader 102 maps data elements to FBO locations, while the fragment shader 106 blends the data elements assigned to each FBO location.

The graphics processing 12 generates a sequence of stacked images as the hash table 14 to handle collisions where the data elements map to a common FBO location. In some implementations, collisions result due to highly convergent mapping from (domain-bounded) data space to (hardware-limited) image space. In some implementations, collisions result due to duplicate attribute values. All records that had collisions with the first i images get hashed onto the i+1$^{th}$ image on a first-come-first-served basis. The stacked images are created through iterative rendering of the input table R 10. If the hash table 14 comprises t images (where t is a positive integer), the build phase 202 requires t rendering passes. For example, if the hash table 14 comprises the image $H_0$ and the image $H_1$, two rendering passes occurred.

A boolean, flag array 36, which is indexed by the RIDs of $R_j$ keeps track of the RIDs that have been successfully entered into the stacked sequence of images and ensures that all tuples are eventually processed. The flag array 36 is initialized with all its entries being false.

Before the start of the rendering, the FBO which stores the hash image is cleared so that all its pixels are colored (0, 0, 0, 0). Each record of $R_j$ is then processed as a vertex, implying that $R_j$ itself is bound as a vertex buffer.

The vertex shader 102 is used to map the input records of $R_j$ to 2D positions assigned by h(k). Each vertex of a vertex buffer is processed in parallel during the rendering. The driver takes care of parallelizing this process as well as prefetching the appropriate vertices into the local memories of the corresponding cores of the GPU. For example, the vertex shader 102a processes the RID 0, the vertex shader 102b processes the RID 1, the vertex shader 102c processes the RID 2, the vertex shader 102d processes the RID 2, and the vertex shader 102e processes the RID 4.

The transformed vertices are rasterized into a set of fragments 22a, 22b, 22c, 22d, 22e by the vertex post processing 104 in the graphics pipeline 100. The fragments 22a, 22b, 22c, 22d, 22e are then processed in parallel by the fragment shader 106. For example, the fragment shader 106a processes the fragment 22a, the fragment shader 106b processes the fragment 22b, the fragment shader 106c processes the fragment 22c, the fragment shader 106d processes the fragment 22d, and the fragment shader 106e processes the fragment 22e.

The fragment shader 106 for the first rendering pass encodes the join attribute-row id pair of the corresponding vertex as the color of that fragment 22a, 22b, 22c, 22d, 22e. Given the four color channels (r, g, b, a), r is set to the row identifier, and g is set to the join attribute value. The value of b is set to 1, and this field is used during the probe phase 204 (FIG. 2) to identify whether a pixel of the hash image (e.g., images included in the hash table 14) has a valid value. The a channel remains unused.

The fragments 22a, 22b, 22c, 22d, 22e are processed by the fragment processing 108 stage in the graphics pipeline 100 to write to the corresponding pixels in the FBO, thereby generating the image $H_0$. The blend function is set to overwrite. When there is a collision, only one of the clashing fragments 22a, 22b, 22c, 22d, 22e is (non-deterministically) output to the final image $H_0$, the winner fragment. For example, RIDs 1 and 2 generate winner fragments overwriting the fragments generated by RIDs 3 (hash collision) and 0 (duplicate join value), respectively.

After completing the $H_0$ image construction using the graphics pipeline 100, the flag array 36 is updated to reflect the input rows of R entered in the image $H_0$. This is achieved in a completely parallel operation using a compute shader (not illustrated). $H_0$ is input to the compute shader as a texture, which processes each pixel to identify if the pixel has been set, and if so, updates the flag array 36 to indicate that the corresponding RID need not be processed again.

Figure 7:
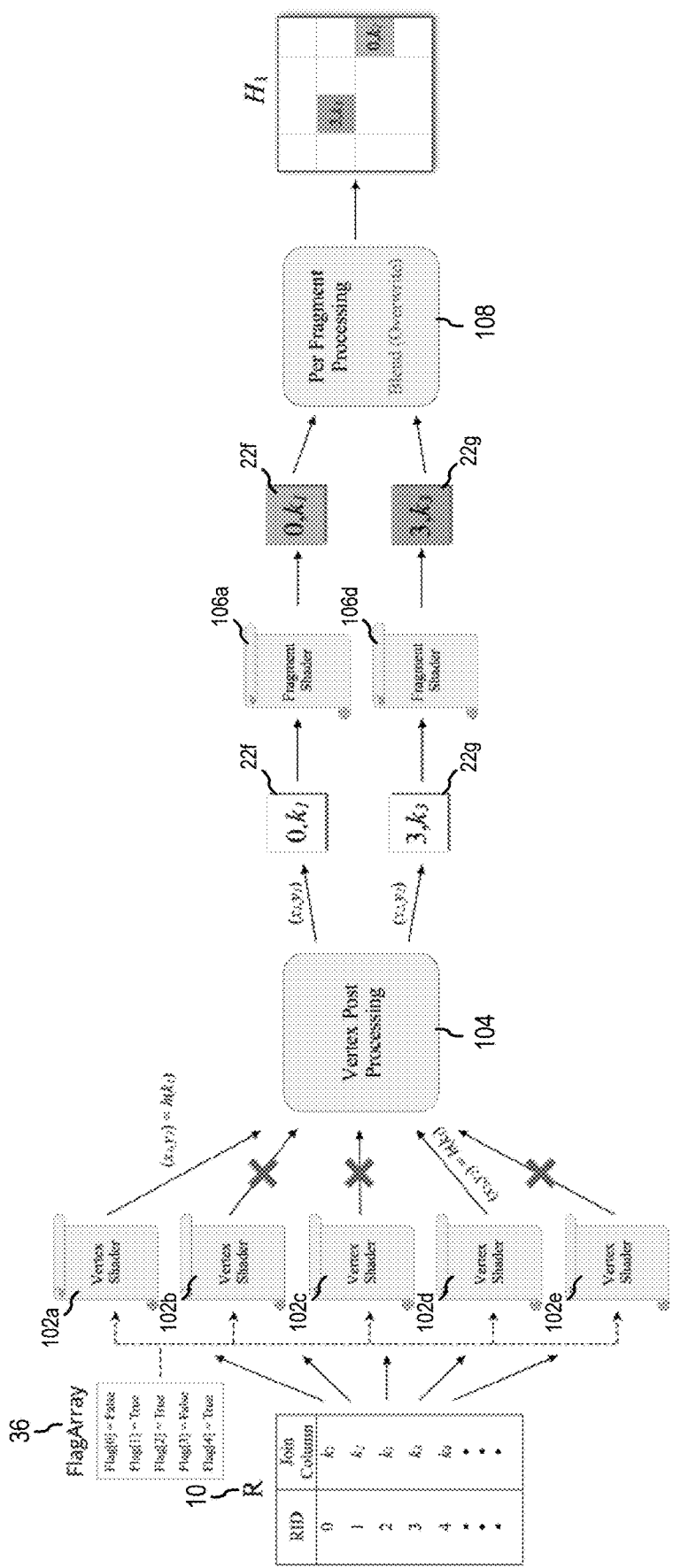
FIG. 7 illustrates an example graphics rendering pipeline for a second iteration of a build phase in accordance with implementations of the present disclosure.

FIG. 7 illustrates an example of a rendering pipeline for the graphics processing 12 (FIG. 2) for a second iteration of a build phase 202 (FIG. 2) performed by the graphics pipeline 100 (FIG. 1). The subsequent passes operate in a similar manner as the first iteration (FIG. 6). In each subsequent pass, the hashing scope is restricted to the input RIDs in the flag array 36 with a false entry, the records that have not yet been entered into any of the stacked images (e.g., the image $H_0$).

The vertex shader 102 transforms the vertices corresponding to RIDs with an entry in the flag array 36 as true so that they get clipped by the graphics pipeline 100 (denoted by the X's). For example, the vertex shader 102a determines the entry in the flag array 36 for RID 0 in the input table R 10 is false and maps the value of the join column for RID 0 to a 2D position assigned by h(k). The vertex shader 102b determines the entry in the flag array 36 for RID 1 is true and clips the entry for RID 1. The vertex shader 102c determines the entry in the flag array 36 for RID 2 is true and clips the entry for RID 2. The vertex shader 102d determines the entry in the flag array 36 for RID 3 is false and maps the value of the join column for RID 3 to a 2D position assigned by h(k). The vertex shader 102e determines the entry in the flag array 36 for RID 4 is true and clips the entry for RID 4.

The fragments 22f, 22g generated by the vertex shader 102a, 102d are processed by the fragment shader 106. For example, the fragment shader 106a encodes the join attribute-row id pair of the corresponding vertex as the color of the fragment 22f and the fragment shader 106d encodes the join attribute-row id pair of the corresponding vertex as the color of the fragment 22g. Given the four color channels (r, g, b, a), r is set to the row identifier, and g is set to the join attribute value. The value of b is set to 1, and this field is used during the probe phase 204 (FIG. 2) to identify whether a pixel of the hash image (e.g., a 2D image included in the hash table 14) has a valid value. The a channel remains unused.

The fragment processing 108 blends the newly generated fragments 22f, 22g together to create the hash image $H_i$ corresponding to the current iteration i. An update of the flag array 36 occurs to reflect the winner fragments in the blending contest. The build phase 202 on Rj terminates when all entries in the flag array 36 become true, signifying that all tuples in Rj have been processed.

In some implementations, a compute statistics step is performed by the graphics pipeline 100 prior to the build phase 202, which counts the number of hash images required (e.g., the image $H_0$ and the image $H_1$) for $R_j$ and $S_j$, respectively. The hash images are then dynamically built on the partition ($R_j$ or $S_j$) with the smaller number of images, resulting in what may be termed as a snake join where the build can switch between R and S partitions and is not exclusive to a single relation.

The compute statistics step is executed using the graphics pipeline 100. The compute statistics step uses the same vertex shader 102 as the hash phase (e.g., the build phase 202). The fragment shader 106 outputs the color (1, *, *, *) and sets the blend function to add the fragments. Thus, at the end of this rendering, each pixel of the output image will have the number of clashes corresponding to that pixel location. The maximum value over all these pixels gives the number of hash images that are required. Since the compute statistics step is done in a single rendering pass, the overhead is small, especially when compared to the potential degradation due to building hash images on the wrong partition.

Figure 8:
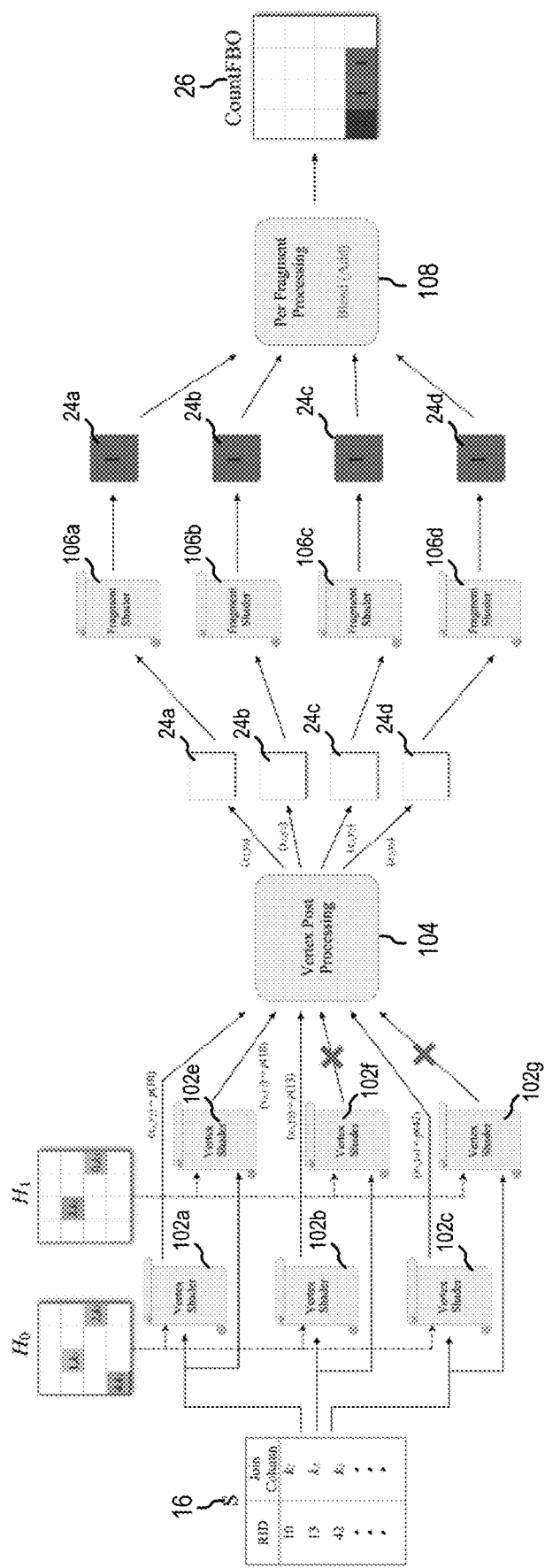
FIG. 8 illustrates an example graphics rendering pipeline for a count phase in accordance with implementations of the present disclosure.

FIG. 8 illustrates an example of a rendering pipeline for a count phase performed by the graphics pipeline 100 (FIG. 1). In some implementations, a count phase is added between the build phase 202 (FIG. 2) and the probe phase 204 (FIG. 2) due to the inability to dynamically allocate memory on the GPU to materialize the join operation. In some implementations, the join operation is an equi-join operation.

The size of the materialized join depends on the distribution of the input relations. The graphics pipeline APIs do not allow dynamic memory allocation during pipeline execution, making it necessary to determine the output size prior to materializing the join. Even if the inputs fit into GPU memory, the join output may be much larger. The size of the materialized join is computed, followed by identifying the location at which to store the output records. The size of the materialized join and the location at which to store the output records is used by the probe phase 204 to materialize the join.

The count phase is accomplished using a single rendering pass of the graphics pipeline 100. The rows $S_j$ in the input table S 16 are bound as vertex buffers, and each row is processed as a single vertex in the vertex shader 102. In the illustrated example six vertex shaders 102 are used to process the rows in the input table S 16. Each row is compared to the input images $H_0$ and $H_1$. For example, the vertex shader 102a processes the row with the RID 10 with input image $H_0$, the vertex shader 102b processes the row with the RID 13 with the input image $H_0$, and the vertex shader 102c processes the row with the RID 42 with the input image $H_0$. The vertex shader 102e processes the row with the RID 10 with the input image $H_1$, the vertex shader 102f processes the row with the RID 13 with the input image $H_1$, and the vertex shader 102g processes the row with the RID 42 with the input image $H_1$.

Unlike in the hash phase (the build phase 202), where a single pass rendered all vertices of the input, for the count step, the graphics pipeline 100 is set to render t times (where t is a positive integer) using instanced rendering. Instance rendering efficiently renders a specific object multiple times, but each time with different parameters.

For each vertex of $S_j$, a set of t vertex shader 102 instances are spawned. Given a vertex $(RIDs, k) \in S_j$, and i, $0 \le i < t$, the corresponding vertex shader 102 instance first transforms k to its hash location using the hash function h(k). The vertex shader 102 reads the color (r, g, b, a) of the pixel at h(k) in the hash image $H_i$. If k is not equal to g, the record pair r (an RID in R) and RIDs do not form a row in the join output, and the output of the vertex shader is a location outside the clip region, which does not create a fragment to be processed further. For example, the vertex shader 102g processing RIDs=42 and i=1 does not create a fragment.

If k is equal to g, then (r, RIDs) forms a valid row in the join output, and the vertex shader 102 outputs a location p (RIDs), where p is a function that uniquely maps the row in $S_j$ to a location in the output image. The graphics pipeline 100 provides an implicit vertex indexing that follows the order of the vertices in a vertex buffer as an in-built variable in the vertex shader 102, and thus, has a one-to-one mapping between RIDs and the vertex index $v_{in}$. The function p is then defined as equation 2:

$$p(RIDs) = p^{1 \to 2}(v_{in}(RIDs)) \qquad (2)$$

where p1→2 maps an integer to a 2D coordinate using a row-major ordering.

In the illustrated example, four fragments 24a, 24b, 24c, 24d are generated by the vertex shader 102. The fragment shader 106 processes the fragments 24a, 24b, 24c, 24d by setting the fragments color to (1, *, *, *) where * denotes that the color channel is not used. The blend function for the count pipeline is set to add the colors (note the difference from the build phase 202, where the blend function is overwrite). The fragment processing 108 stage adds all the colors of the fragments 24a, 24b, 24c, 24d corresponding to a single pixel, and sets the color of the pixel to this sum capturing the number of rows in $R_j$ that match a given row in $S_j$. At the end of the rendering pass, each pixel of the FBO stores the number of output rows corresponding to the input row associated with that pixel location in a count FBO 26.

In some implementations, the count phase identifies in advance the location in the output array where each result row should be stored. An exclusive prefix sum of the elements of the count FBO 26 is performed and stored as a count array 28 (FIG. 7). Assume that $|S_j|$ is less than the number of elements in the count array 28. After this operation, the value of the last element of the count array 28 captures the cardinality of the join output. Further, if a linear array is constructed of this cardinality, the output corresponding to record RIDs is stored in the count array 28 (countarr) from index CountArr[p(RIDS)] onward.

Figure 9:
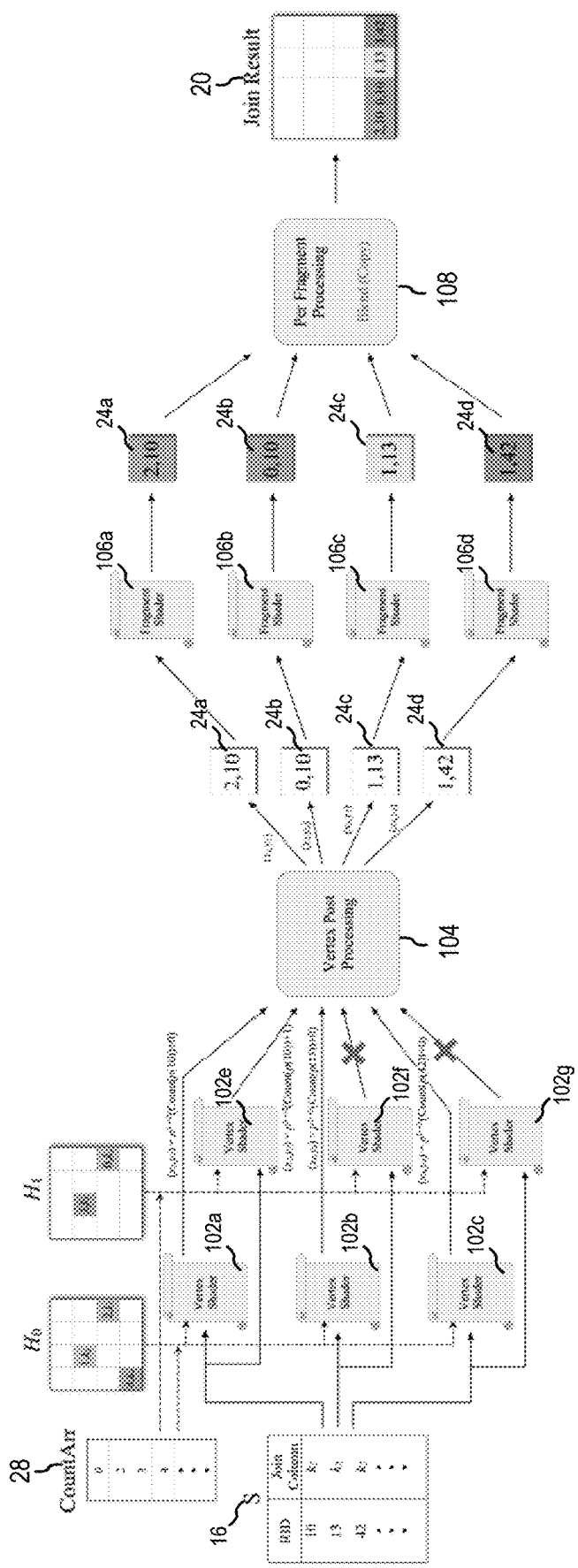
FIG. 9 illustrates an example graphics rendering pipeline for a probe phase in accordance with implementations of the present disclosure.

FIG. 9 illustrates an example of a rendering pipeline for the graphics processing 18 (FIG. 2) of a probe phase 206 (FIG. 2) performed by the graphics pipeline 100 (FIG. 1). The number of hash images (e.g., the image $H_0$ and $H_1$) in the hash table 14 (FIG. 2) created in the build phase 202 (FIG. 2) is t (where t is a positive integer). The probe phase 206 tests and matches each record in $S_j$ with the t pixels (one per hash image) corresponding to the location defined by the hash function h( ).

The hash images (e.g., the image $H_0$ and $H_1$), the count array 28, and the input table S 16 are provided as input to the vertex shader 102. If a vertex $(RIDs, k) \in S_j$ matches with the image $H_i$ to produce an output record, the location of this output is computed by the vertex shader 102 using the count array 28 (CountArr) in equation (3) as:

$$loc = atomicAdd(CountArr[p(RIDS)], 1), \qquad (3)$$

where atomicAdd( ) atomically increments the value at CountArr[p(id)] by 1, and then returns its original value prior to the increment.

The equation 3 provides the vertex shader 102 a lock-free mechanism for identifying the index within the output array. The actual 2D location where the join output is written to in the FBO is obtained by the vertex shader 102 using the function $p^{1 \to 2}$ (loc), where $p^{1 \to 2}$ is the same 1D-to-2D function as used in equation 2. The vertex shader 102 also passes along the values of the matched row ids, i.e., RIDs and $RID_R$=r (r was obtained using a texture lookup on $H_i$).

The vertex post processing 104 outputs the rasterized fragments 24a, 24b, 24c, 24d. The fragments 24a, 24b, 24c, 24d are written to the result FBO at their designated locations by the fragment shader 106. The colors of the fragments 24a, 24b, 24c, 24d are set as ($RID_R$, $RID_S$, *, *), denoting the matching join records. At the end of the rendering pass for the probe phase 204, the result FBO output (e.g., the query result 20) by the fragment processing 108 contains the materialized join identifiers. In some implementations, the join operation is an equi-join operation.

By using instance rendering, each vertex shader 102a, 102b, 102c, 102d, 102e, 102f, 102g instance and each fragment shader 106a, 106b, 106c, 106d instance has constant time complexity (because of no loops), the graphics driver can efficiently schedule the parallel threads to maximize GPU utilization. In addition, each vertex shader 102a, 102b, 102c, 102d, 102e, 102f, 102g reads from exactly one texture, which gives the graphics driver leeway to appropriately schedule threads and the corresponding texture prefetches. Instance rendering also allows the use the efficient FBO writes to output the join results.

In some implementations, the physical size of the FBO, used for materializing the join, is smaller than the join output size computed in the previous step. The probe phase 204 is split into multiple rendering passes such that the output size from each pass is accommodated within the FBO output. The specific records in $S_j$ that are processed in each pass are determined using the count array 28. The count array 28 is used to partition $S_j$ such that the join resulting from each partition fits within the FBO output. At the end of each pass, the result FBO output is transferred to the CPU before starting the next pass.

In some implementations, a large hash stack size (i.e., a large t) is handled in the probe phase 204. If the GPU has limited memory available, the GPU will not be able to handle a large hash stack size on the $R_j$ partition. The stack height of the hash images is limited to a fixed number (e.g., SH_limit) that can comfortably fit in the GPU memory. For example, the stack height required for the join is found to be greater than the limit (e.g., the SH_limit) arising out of a large number of duplicates or hash collisions. The hash computation is paused after the SH_limit images are generated in the probe phase 204 and run in the probe phase 204, and subsequently generate the next stack of hash images. This punctuated process requires that a flag array F is kept current, and the flag array F is fed to the rendering pipeline when the next hashing cycle is initiated.

Figure 10:
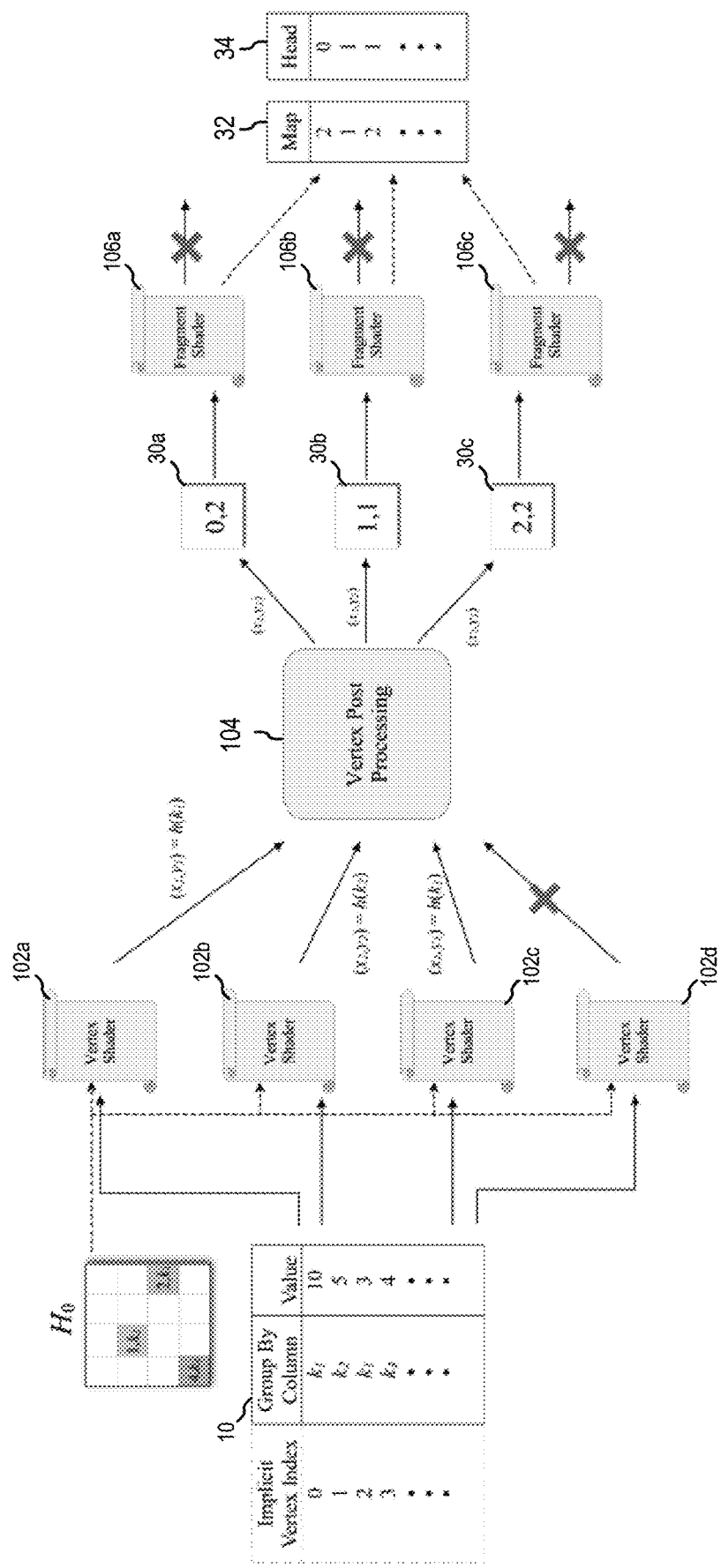
FIG. 10 illustrates an example graphics rendering pipeline of a grouping step in accordance with implementations of the present disclosure.

FIG. 10 illustrates an example rendering pipeline in a grouping step of the graphics processing 18 (FIG. 2) of a probe phase 206 (FIG. 2) for a group by operation performed by the graphics pipeline 100 (FIG. 1). In some implementations, the grouping step is for a single-attribute grouping where the input comprises n pairs of the form (k, val), where k is a 32-bit integer grouping attribute, and val is the associated value that feeds into an aggregate operation. In some implementations, the data in the input table (e.g., the input table R 10) does not fit in the GPU memory and the input table is first portioned into batches that are GPU-resident and the rendering pipeline iteratively processes the batches. In some implementations, the initial grouping steps uses iterative processing of two rendering pipelines. The first is similar to the hashing pipeline used in the join operation, creating a series of hashed images (e.g., the hash table 14 (FIG. 2)) on the grouping attribute k.

The hash image $H_0$ (the hash image created in a first iteration of the build phase 202 (FIG. 2) for hash collisions) is used by the vertex shaders 102a, 102b, 102c, 102d in the second rendering pipeline to map each tuple of the input table R 10 to a unique position defined by the grouping value.

The vertex shaders 102a, 102b, 102c, 102d map the $RIDv_{in}$ (implicit vertex index) of the vertex being processed to the RID of the hashed vertex obtained by looking up $H_i[h(k)]$, where k is the group by attribute of the vertex being processed, and i is the iteration number. If they are equal, the RID $v_{in}$ is mapped to the RID in $H_i[h(k)]$ by the vertex shaders 102a, 102b, 102c, 102d. When multiple tuples share the same attribute value, one of the tuples is identified as the head for the group, and all the others point to this head. The vertex post processing 104 output fragments 30a, 30b, 30c.

For example, RIDs 0 and 2 corresponding to group-by attribute $k_1$ get mapped to 2. The head for this group is record 2. This mapping is stored using a map buffer 32. The records corresponding to the heads of the different groups are stored in a separate head buffer 34. The head buffer 34 stores a 1 for records that form the heads of their respective groups, and 0 for the others. The fragment shaders 106a, 106b, 106c update the map buffer 32 and the head buffer 34.

The pair of rendering pipelines are run iteratively until no more collisions are present, and all the input records have been processed. Since the hash image (the image $H_0$) generated in an iteration is immediately consumed, it is not necessary to store multiple images, unlike in the join operation.

Figure 11:
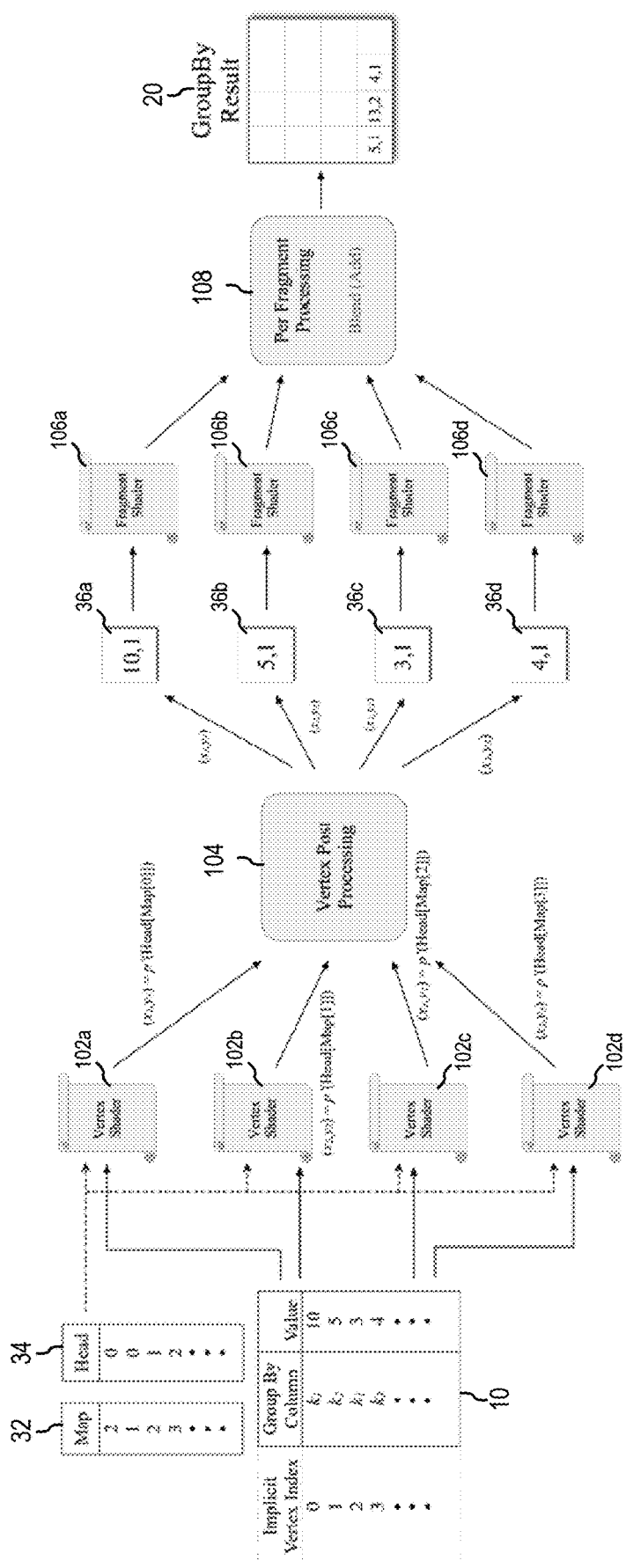
FIG. 11 illustrates an example graphics rendering pipeline for computing aggregates in accordance with implementations of the present disclosure.

FIG. 11 illustrates an example rendering pipeline for computing aggregates of the graphics processing 18 (FIG. 2) of a probe phase 206 (FIG. 2) for a group by operation performed by the graphics pipeline 100 (FIG. 1). The aggregation is accomplished in a single rendering pass. In some implementations, prior to computing the aggregation, a prefix sum operation is first executed on the head buffer 34 by writing directly to storage buffers instead of an FBO in the grouping step. The prefix sum of the head buffer 34 provides the required output location index for each group.

The vertex shaders 102a, 102b, 102c, 102d use the map buffer 32 and the head buffer 34 to transform a given record in the input table R 10 to a mapped location. When the vertex shaders 102a, 102b, 102c, 102d process a record with vertex index $v_{in}$, its group is given by $Map[v_{in}]$, and its location (loc) in a 1D array is provided by $loc=Head[Map[v_{in}]]$. The location in the output FBO is then obtained by using the mapping $p^{1 \rightarrow 2}(loc)$, where $p^{1 \rightarrow 2}$ is the 1D-to-2D function of equation 2. The vertex post processing 104 outputs the fragments 36a, 36b, 36c, 36d with the mapped location for the given records of the input table R 10.

The fragment shaders 106a, 106b, 106c, 106d output the appropriate color for the fragments 36a, 36b, 36c, 36d depending on the aggregate function. The fragment processing 108 blends the colors together to generate the final output FBO (the query result 20 with the group by result), which is then returned to the CPU.

The different blend functions used by the fragment processing 108 and the colors used by the fragment shaders 106a, 106b, 106c, 106d for the different aggregate functions are shown in Table 1.

TABLE 1

| Aggregate | Color | Blend |
| --- | --- | --- |
| Count | (1, *, *, *) | add |
| Sum | (val, *, *, *) | add |
| Min | (val, *, *, *) | min |
| Max | (val, *, *, *) | max |
| Avg | (val, 1, *, *) | add |

For the case of average, there is there is a post-processing step which computes the average by dividing the r channel (which stores the sum of the output pixels), with the g channel (which stores the count of these pixels). The post-processing computation is a fully parallel operation, that the compute shader is invoked for the evaluation.

In some implementations, the group by operation is for multiple attributes and the query features/group by attributes k1, k2, . . . , kl. The grouping step hashes only one of the attributes. Different from the single attribute group by, the fragment shader 106 writes to the hash FBO all the attributes k1, k2, . . . , kl, which may raise a storage issue. An image pixel can store only 4 values corresponding to r, g, b and a, of which 3 are already used to store the RID (r), group by attribute (g), and validity flag (b). At most, one more grouping attribute can be natively accommodated in the pixel. But, if l>2, then additional graphics machinery is needed to handle the overflow.

In some implementations, multiple color attachments are used for the FBO to handle the overflow. Given a query with l grouping attributes, a total of ⌈l+2/4⌉ attachments are required to accommodate them. Attributes $k_i$, i≥2 onward are written to the ⌈i+2/4⌉$^{th}$ attachment of the FBO. The mapping pipeline is modified to compare with all the attributes to identify a clash during the mapping phase of the grouping step. This is implemented by binding all the attachments as textures in the second grouping pipeline. The remaining steps of the multi attribute algorithm are the same as those of the single-attribute group by.

In some implementations, the attribute that is most diverse is chosen for the hashing operation. For example, the attributes with the most number of unique values is chosen to perform the hash. Another example includes dynamically computing fine-grained histograms on all the group by attributes during the first step of the radix partitioning and using the number of non-empty bins as a heuristic to approximate the diversity of the attributes. Once identified, the partitioning is carried out using the chosen attribute, and it continues to be used in the grouping step.

Figure 12:
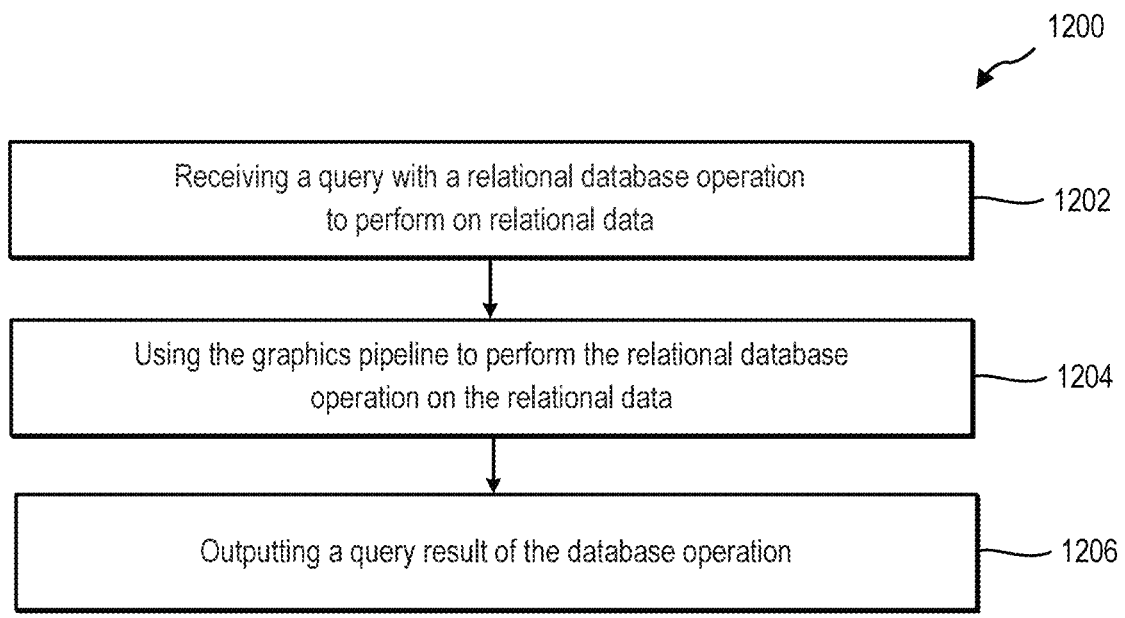
FIG. 12 illustrates an example method for using the graphics pipeline for performing relational database operations in accordance with implementations of the present disclosure.

Referring now to FIG. 12, illustrated is an example method 1200 for using the graphics pipeline for performing relational database operations. The actions of the method 1200 are discussed below with reference to FIGS. 1-11.

At 1202, the method 1200 includes receiving a query with a relational database operation to perform on relational data. In some implementations, the relational database operation is a join operation between a first input table (e.g., the input table R 10) of relational data and a second input table (e.g., the input table S 16) of relational data. One example join operation is an equi-join operation that combines records across tables that have matching fields. In some implementations, the relational database operation is a group by operation on an input table (e.g., the input table R 10) of the relational data.

In some implementations, a database query includes a plurality of operations and the graphics pipeline 100 is used to perform a subset of the operations included in the database query while a CPU processes the other operations included in the database query. For example, the database query includes a join operation, a group by operation, a project operation, and a difference operation and the graphics pipeline 100 is used to process the join and group by operation for the database query on the GPU(s) while a example includes, the database query includes a plurality of group by operations, a CPU processes the project and difference operations for the database query. Another plurality of join operations, and a project operation, and the GPU(s) perform the plurality of group by operations and plurality of join operations while a CPU processes the project operation.

At 1204, the method 1200 includes using the graphics pipeline to perform the relational database operation on the relational data. The graphics pipeline 100 includes a vertex shader 102, vertex post processing 104, a fragment shader 106, and fragment processing 108. In some implementations, the graphics pipeline 100 is executed by a graphics processing unit (GPU). In some implementations, the graphics pipeline 100 is executed by a plurality of GPUs in communication with each other. The graphics pipeline 100 performs a build phase 202 on the relational data to create a hash table 14 of the relational data, wherein the hash table 14 maps the relational data to a stack of two-dimensional (2D) images.

In some implementations, the relational database operation is a join operation and the stack of 2D images is created for the first input table (e.g., the input table R 10) of relational data and each 2D image in the stack of 2D images is created in response to a hash collision for the relational data or duplicate attribute values of the relational data.

In some implementations, the vertex shader 102 uses a flag array 36 to track which attribute values of the relational data are included in the stack of 2D images and which attribute values of the relational data need processing. The graphics pipeline 100 continues to perform the build phase 202 until the flag array 36 indicates that all the relation data is processed.

In some implementations, the relational database operation is a group by operation and the build phase 202 creates the stack of images for an input table (e.g., the input table R 10) of the relational data. A hash table 14 with a plurality of 2D images is created in the build phase 202, where each 2D image is created for hash collisions, and not for duplicate attribute values. The build phase 202 uses the graphics pipeline 100 to create a series of hash images on the grouping attribute k for the input table R 10. The implicit vertex index provided by the graphics pipeline 100 is used as the RID while generating the 2D images for the hash table 14.

The graphics pipeline 100 also performs a probe phase 204 on the relational database operation by rendering the relational database operation on the hash table 14 and outputting the query result 20 of the database operation. In some implementations, the join operation is accomplished in the probe phase 204 by rendering the probe relation against the hash table 14 and outputting a query result 20. The probe phase 204 uses the graphics pipeline 100 to perform a lookup for every row in the input table S 16 to determine all pairs of the input table R 10 and the input table S 16 where the join attributes are the same (e.g., a match occurs with rows in the input table R 10). The fragment processing 108 applies color to the pixels indicating matching join records between the relational data in the input table R 10 and the relational data in the input table S 16. The query result 20 includes the pixels of the matches that indicate a join of the input table R 10 and the input table S 16.

In some implementations, the group by operation is accomplished in the probe phase 204 by using the stack of 2D images in the hash table 14 by the vertex shader 102 to map each tuple of the input table R 10 to a unique position defined by the grouping value. The vertex post processing 104 generates the fragments with the position and the grouping value. The fragment shader 106 assigns the values to be aggregated to the fragments. The fragment shader 106 outputs the appropriate colors for the fragments depending on the aggregation function. Example aggregation functions include count, sum, minimum, maximum, and average. The fragment processing 108 applies a blend function based on the aggregation function. The colors are blended in the fragment processing 108 stage to generate the final output FBO with the group by query result 20.

In some implementations, the graphics pipeline 100 performs a count phase that determines the amount of graphics processing unit (GPU) memory required for the relational database operation and allocates the amount of GPU memory for the query result 20.

At 1206, the method 1200 includes outputting a query result of the database operation. In some implementations, the query result 20 is presented on a display of a device. In some implementations, the query result 20 is provided to a central processing unit (CPU).

By using the graphics pipeline 100 to perform the relational database operations, the hardware tuning is automatically obtained, and the graphics driver manages the parallelism of the data and the necessary data allocation across different thread groups to optimize fast vertex data reads (including data pre-fetching). Using the GPU(s) to process relational database operations result in faster queries on the database.

Figure 13:
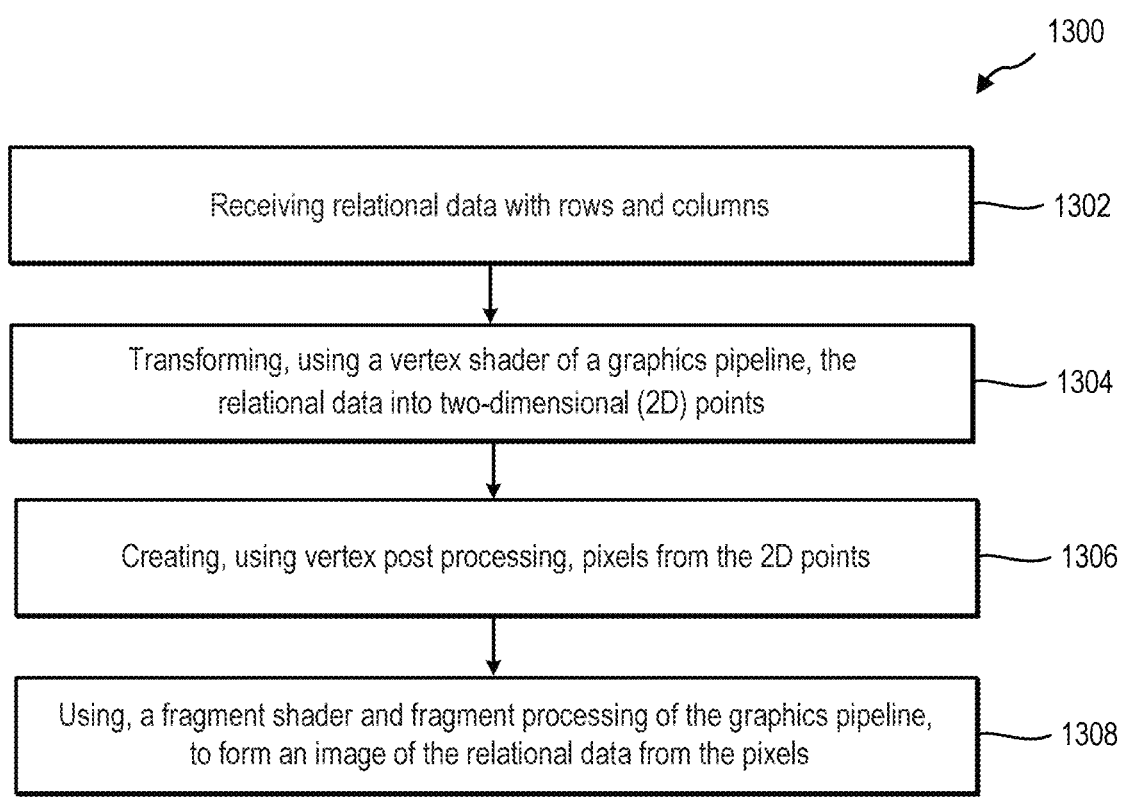
FIG. 13 illustrates an example method for mapping relational data into an image in accordance with implementations of the present disclosure.

Referring now to FIG. 13, illustrated is an example method 1300 for mapping relational data into an image. The actions of the method 1300 are discussed below with reference to FIGS. 1-11.

At 1302, the method 1300 includes receiving relational data with rows and columns. The graphics pipeline 100 receives the relational data. For example, an input table R 10 is received with a plurality of rows and columns of relational data.

At 1304, the method 1300 includes transforming, using a vertex shader of a graphics pipeline, the relational data into two-dimensional (2D) points. The vertex shader 102 maps every row in the input table R 10 to a 2D point using a hash function.

At 1306, the method 1300 includes creating, using vertex post processing, pixels from the 2D points. The locations for the pixels are determined through hash functions on the attribute values in the columns of the relational data. The vertex post processing 104 takes the 2D points and converts the 2D points into a set of pixels (the fragments) with a coordinate position.

At 1308, the method 1300 includes using, a fragment shader and fragment processing of the graphics pipeline, to form an image of the relational data from the pixels. In some implementations, the fragment shader 106 assigns a color to the pixels and the color is used to assign a row identifier for the relational data and an attribute value of the relational data. The color channels (r, g, b, a) are used to store the hash tables 14. The fragment processing 108 stage forms a set of images of the tabular data from the input table R 10. The hash table 14 is the set of images formed by the fragment processing 108 stage. The additional images handle collisions where the rows in the input table R 10 map to a common coordinate (position).

In some implementations, the fragment processing 108 blends the pixels together by applying a blend function to form the images of the relational data. For example, the blend function is an overwrite for pixels that map to a common location and an additional image (e.g., the image $H_1$) is created with the relational data for the pixels that maps to the common location.

In some implementations, the method 1300 further includes using the images (e.g., the images of the hash table 14) by a graphics pipeline 100 to perform relational database operations in response to a query. In some implementations, the relational database operation is a join operation. One example join operation includes an equi-join operation. In some implementations, the relational database operation is a group by operation. The method 1300 includes outputting a query result for the database operation. In some implementations, a GPU processes the graphics pipeline 100. In some implementations, a plurality of GPUs in communication with each other process the graphics pipeline 100.

By making use of images to store the hash tables 14, faster texture lookup operations occur when performing the database operations using the graphics pipeline 100 and more efficient data writes into the FBOs occur.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a query with a relational database operation to perform on relational data;
   using a graphics pipeline to perform the relational database operation on the relational data; and
   outputting a query result of the relational database operation, wherein the graphics pipeline performs:
      a build phase on the relational data to create a hash table of the relational data, wherein the hash table maps the relational data to a stack of two-dimensional (2D) images;
      using a flag array to track which attribute values of the relational data are included in the stack of 2D images and which attribute values of the relational data needs processing;
      continuing to perform the build phase until the flag array indicates that all the relational data is processed; and
      a probe phase that performs the relational database operation by rendering the relational database operation on the hash table and outputting the query result.

2. The method of claim 1, wherein the graphics pipeline is executed by a graphics processing unit (GPU) and the graphics pipeline includes a vertex shader, vertex post processing, a fragment shader, and fragment processing.

3. The method of claim 1, wherein the relational database operation is an equi-join operation between a first input table of relational data and a second input table of relational data.

4. The method of claim 3, wherein the stack of 2D images is created for the first input table of relational data and each 2D image in the stack of 2D images is created in response to a hash collision for the relational data or duplicate attribute values of the relational data.

5. The method of claim 4, wherein the probe phase:
   performs a lookup for each record in the second input table to each 2D image in the stack of 2D images to identify matches between the relational data in the second input table and attribute values of the relational data in the first input table;
   converts the matches to pixels; and
   performs post processing that applies color to the pixels indicating matching join records between the relational data in the first input table and the relational data in the second input table and the query result includes the pixels.

6. The method of claim 1, further comprising:
   performing a count phase that determines an amount of graphics processing unit (GPU) memory required for the relational database operation; and
   allocating the amount of GPU memory for the query result.

7. The method of claim 1, wherein the relational database operation is a group by operation on an input table of the relational data and each 2D image of the stack of 2D images is created in response to a hash collision for the relational data.

8. The method of claim 7, wherein the probe phase:
   uses the stack of 2D images to map the relational data to positions defined by a grouping value;
   generates pixels with the positions and the grouping values;
   performs post processing that applies color to the pixels indicating an aggregate function and attribute values of the relational data; and
   performs a blend function of the pixels based on the aggregation function and the query output includes the blended pixels.

9. The method of claim 8, wherein the aggregate function includes a count, a sum, a minimum, a maximum, or an average.

10. The method of claim 1, wherein the query result is provided to a central processing unit (CPU).

11. A device, comprising:
   a memory to store data and instructions; and
   a graphics processing unit operable to communicate with the memory, wherein the graphics processing unit is operable to:
      receive a query with a relational database operation to perform on relational data, wherein the relational database operation is an equi-join operation between a first input table of relational data and a second input table of relational data;
      use a graphics pipeline to perform the relational database operation on the relational data by performing:
         a build phase on the relational data to create a hash table of the relational data, wherein the hash table maps the relational data to a stack of two-dimensional (2D) images and the stack of 2D images is created for the first input table of relational data and each 2D image in the stack of 2D images is created in response to a hash collision for the relational data or duplicate attribute values of the relational data; and
         a probe phase that performs the relational database operation by rendering the relational database operation on the hash table; and
      output a query result of the relational database operation.

12. The device of claim 11, wherein the probe phase:
   performs a lookup for each record in the second input table to each 2D image in the stack of 2D images to identify matches between the relational data in the second input table and attribute values of the relational data in the first input table;

converts the matches to pixels; and performs post processing that applies color to the pixels indicating matching join records between the relational data in the first input table and the relational data in the second input table and the query result includes the pixels.

13. The device of claim 11, wherein the graphics pipeline includes a vertex shader, vertex post processing, a fragment shader, and fragment processing.

14. The device of claim 11, wherein the query result is provided to a central processing unit (CPU).

15. A method, comprising:

receiving a query with a relational database operation to perform on relational data, wherein the relational database operation is a group by operation on an input table of the relational data;

using a graphics pipeline to perform the relational database operation on the relational data; and outputting a query result of the relational database operation, wherein the graphics pipeline performs:

a build phase on the relational data to create a hash table of the relational data, wherein the hash table maps the relational data to a stack of two-dimensional (2D) images and each 2D image of the stack of 2D images is created in response to a hash collision for the relational data; and a probe phase that performs the relational database operation by rendering the relational database operation on the hash table and outputting the query result.

16. The method of claim 15, wherein the probe phase:

uses the stack of 2D images to map the relational data to positions defined by a grouping value;

generates pixels with the positions and the grouping values;

performs post processing that applies color to the pixels indicating an aggregate function and attribute values of the relational data; and performs a blend function of the pixels based on the aggregation function and the query output includes the blended pixels.

17. The method of claim 16, wherein the aggregate function includes a count, a sum, a minimum, a maximum, or an average.

18. The method of claim 15, wherein the graphics pipeline includes a vertex shader, vertex post processing, a fragment shader, and fragment processing.

19. The method of claim 15, wherein the graphics pipeline is executed by a graphics processing unit (GPU) and the graphics pipeline includes a vertex shader, vertex post processing, a fragment shader, and fragment processing.

* * * * *